May 12, 1959 D. O. BENSON 2,886,117
BLADE HANGER
Filed May 9, 1955
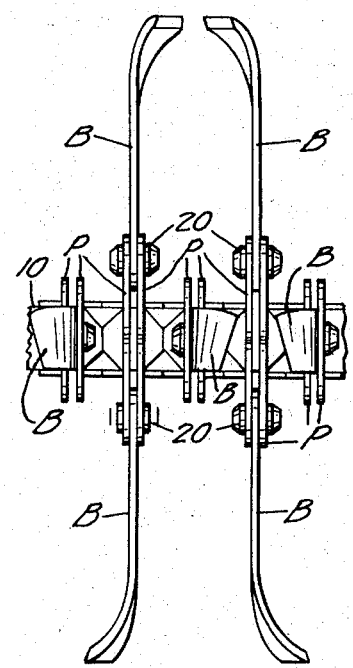
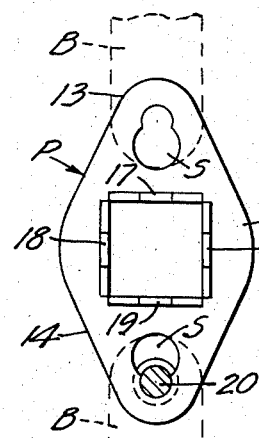
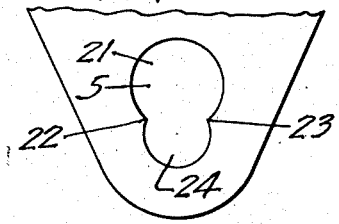
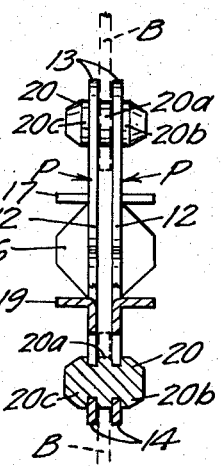
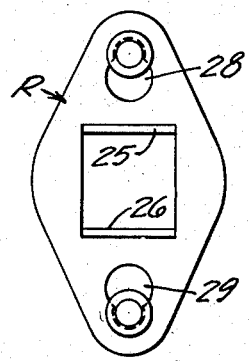
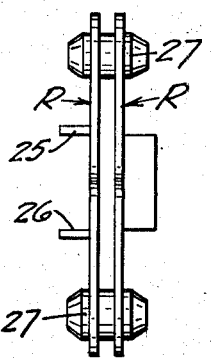
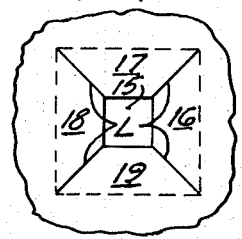
INVENTOR
DON O. BENSON
BY Williamson, Schroeder, Adams + Meyers
ATTORNEYS United States Patent Office 2,886,117
Patented May 12, 1959

2,886,117

BLADE HANGER

Don O. Benson, Minneapolis, Minn., assignor to Toro Manufacturing Corporation of Minnesota, Minneapolis, Minn., a corporation of Minnesota Application May 9, 1955, Serial No. 506,891

8 Claims. (Cl. 172—545)

This invention relates to rotary blades. More particularly, it relates to unique mounting means for rotary blades.

One of the most serious disadvantages of rotary knives or blades in various cutting machines is that when such a blade is seriously damaged or dulled, it is a labor and time-consuming operation to remove the damaged or unsatisfactory blade and substitute a new blade therefor. This is especially true in the use of the type of rotary blades wherein they are pivotally mounted and depend upon a high speed of rotation to maintain them in radially extending position to effect the proper cutting operation. When such a type of rotary blade is used, a foreign object such as a rock or piece of heavy iron encountered by the machine will often seriously damage quite a number of the blades, and thereby necessitate their removal. In such instances it will be highly desirable for the operator to be able to quickly remove the damaged blades and insert one or more new or newly sharpened blades therefor. My invention is intended to overcome these disadvantages.

A general object of my invention is to provide a novel and improved blade hanger of simple and inexpensive construction and operation.

A more specific object is to provide a novel and improved blade hanger constructed simply and inexpensively to permit quick and easy substitution of blades thereon.

Another object is to provide a novel and improved blade hanger constructed so as to be capable of long wear and simple and inexpensive replacement.

Another object is to provide a novel and improved blade hanger constructed to simplify the mounting of the same on a rotary shaft for rotation therewith and, because of its unique construction, to maintain itself in desired spaced relation to other and similar blade hangers.

Another object is to provide a novel blade hanger constructed to utilize the centrifugal force of the blade during rotation to insure against detachment of the blade from the hanger.

Another object is to provide a novel blade hanger constructed to uniquely balance the load upon the rotatable shaft and thereby increase the efficiency of the machine.

These and other objects and advantages of the invention will more fully appear from the following description made in connection with the accompanying drawings, wherein like reference characters refer to the same or similar parts throughout the several views, and in which:

Fig. 1 is a side elevational view of a plurality of my blade hangers mounted on a rotary shaft for rotation therewith and supporting a plurality of rotary blades;

Fig. 2 is a front elevational view of the same;

Fig. 3 is a side elevational view of one embodiment of my invention;

Fig. 4 is a front elevational or edge view of a pair of my blade hangers with rotary blades mounted thereon, a portion of the view being shown in section;

Fig. 5 is a fragmentary side elevational view of a blank from which my blade hanger may be formed;

Fig. 6 is a fragmentary side elevational view of the end portions of one of my blade hangers;

Fig. 7 is a side elevational view of a second embodiment of my invention;

Fig. 8 is a front elevational view of the second embodiment shown in Fig. 7; and Fig. 9 is a perspective view of a third embodiment of my invention.

Shown in Figs. 1 and 2 is a plurality of blade hangers embodying my invention, these hangers being mounted on a rotary shaft 10 which is square in cross-section. The shaft 10 extends through the blade hangers which, as shown, are preferably utilized in pairs to support a pair of oppositely extending rotary blades B. As best shown in Figs. 1–5, this embodiment may include an elongated rigid plate member P which is preferably made of a flat sheet of rigid metal and has a central portion 12 and opposite end portions 13 and 14. This plate member P is preferably stamped out of a sheet, as best shown in Fig. 5, wherein the central portion of the blank is clearly shown. As shown in Fig. 5, the sheet is cut in the blank form to provide a centrally disposed opening 15, and extending outwardly from this opening is a plurality of diagonally extending lines indicated generally as L. This leaves a plurality of ear-like members 16, 17, 18 and 19 which are preferably bent laterally along the lines which form their bases so that the plate P will appear as clearly shown in Figs. 2, 3 and 4 after the necessary bending has been performed. It will be noted that the ears 16, 17, 18 and 19 are all bent laterally in the same direction and that when they are arranged on the shaft 10, as shown in Fig. 2, they constitute spacer elements between adjacent and similar blade hangers or plates P. As shown in Fig. 2, the plates P are installed or assembled on the shaft 10 in such a manner that the ears 16, 17, 18 and 19 are positioned in opposite directions, so that for each pair of plates P which cooperate to support the blades B, there is a set of bracer ears 16, 17, 18 and 19 extending outwardly from opposite sides of the pair which constitute spacer elements and which provide a bracer function for the plate members P against rocking on the shaft 10.

Formed in each end portion 13 and 14 of each plate member P is an elongated transfer slot S. This transfer slot may also be referred to as a pivot pin journal, for it is adapted to receive therein a pivot pin 20. As shown, this pivot pin carries excess material in each outer portion, this material being tapered to facilitate installation by acting as a guide during installation as well as to provide sufficient body for easier handling. The elongated transfer slot S has a pivot-pin-receiving opening 21 and the slot is arranged longitudinally of the plate P as best shown in Fig. 3. This slot has a restriction intermediate its ends, the restriction being formed by a pair of opposite and inwardly extending projections 22 and 23. Actually the projections are formed by stamping out a pair of circular openings 21 and 24, the openings intersecting each other. The larger pin-receiving opening 21 is disposed between the restriction provided by the projections 22 and 23 and the shaft-engaging portions of the plate P which is the central portion 12. The smaller pivot-pin-engaging opening 24 is disposed radially outwardly of the restriction formed by the projections 22 and 23. By examination of Figs. 3 and 6, it will be readily seen that the radius of the opening 24 is considerably shorter than the radius of the larger opening 21. It will also be seen that the arc which the opening-defining portions of the opening 24 define is slightly greater than a semi-circle.

The pivot pin 20 consists of a pin having a medial portion 20a flanked by a pair of reduced portions 20b and 20c, each of which is disposed intermediate the ends of the pin 20 and at opposite ends of the medial portion 20a. The diameter of the medial portion 20a is the same as the general overall diameter of the pin 20, which is just equal or slightly less than the diameter of the pin-receiving opening 21. The diameter of the reduced portions 20b and 20c of the pivot pin 20 is only slightly greater than the distance between the projections 22 and 23, or in other words, only slightly greater than the restriction formed by these two projections. The radius of the reduced portions 20b and 20c is equal to the radius of the pivot-pin-engaging opening 24 so that when the pivot pin 20 has its reduced portions 20b and 20c forced outwardly past the projections 22 and 23 and into the pin-engaging opening 24, the portion of the plate which defines this opening constitutes a journal for the reduced portions of the pivot pin.

There is an opening in one end portion of the blade B of diameter equal to the medial portion 20a of the pivot pin 20 so that the pivot pin may be passed through this opening and the blade B may be journaled on the medial portion 20a when the pivot pin is supported by a pair of plates P as best shown in Fig. 4.

As best shown in Fig. 1, a pair of plates P is selected and arranged so that their bracer ears 16, 17, 18 and 19 extend in opposite directions. A pivot pin 20 is inserted into the opening provided therefor of a blade B, and then the opposite ends of the pivot pin 20 are inserted in the pin-receiving openings 21 at the corresponding ends of the pair of plates P. The reduced portions 20b and 20c are aligned with the transverse slots 21 and then a sharp tug on the blade B will draw the reduced portions radially outwardly past the projections 22 and 23 and into the pin-engaging or journaling opening 24. The restrictions 22 and 23 will hold the pivot pin 20 in place so that the reduced portions will journal in the portions of the plate P which define the opening 24.

In the embodiment shown in Figs. 7 and 8, similar plate members R are utilized. These plate members R are constructed in exactly the same manner as the plate members P with the exception that two of the oppositely disposed bracer ears such as 16, 18 are cut away along their base lines so that only the other two bracer ears 17, 19 would remain. For the sake of identification, these bracer ears have been identified as 25 and 26 and they function as spacer elements just as do the other bracer ears in the embodiment shown in Figs. 1–5. A pivot pin 27 is constructed identically with the pivot pin 20 and the slots 28 and 29 are constructed identically with the slots S.

In the embodiment shown in Fig. 9, a plate member M is utilized and it is constructed identically with the plate member P except that none of the bracer ears such as 16, 17, 18 and 19 are utilized. On the contrary, these ears are cut away so that only the plate member with the opening 30 is provided. Elongated slots 31 and 32 formed identically with the slots S are utilized in the opposite ends of the plate M and a pair of plates is used in a manner similar to that shown in Figs. 4 and 8. A pivot pin identical to the pivot pin 20 is utilized with each pair of the plates M. A separate spacer element (not shown) is then provided with such blade hangers as the plates M.

To assemble the embodiment shown in Figs. 1–6, a pair of plates P is slid onto the shaft 10, the pair being arranged so that their ears extend outwardly in opposite directions. Each pair of these plates P carries a blade B at its opposite ends as best shown in Fig. 2. Similar pairs of plates P are then slid onto one end of the shaft 10 and then means is provided at that end of the shaft to tighten the various plate supporting assemblies when the entire length of the shaft has been covered by a plurality of these assemblies. It will be readily appreciated that each blade is free to pivot on its supporting pivot pin 20 or 27 as the case may be, and each pivot pin is journaled in the opening 24. The centrifugal force of the blades B pulls outwardly on the pivot pin 20 during the rotation of the shaft 10 and maintains the pivot pin in the smaller opening of the slot S.

When it is desired to remove a blade and substitute another therefor, it is a simple matter to extract the blade from the pair of plates P. A sharp radially inward pressure on the blade B will force the pivot pin 20 to slide into the larger opening 21 and the pivot pin can then be quickly and easily slid laterally free of the plates P, thereby freeing the blade B. A new blade is then inserted between the plates P and the pivot pin re-inserted in the openings 21 until the reduced portions 20b and 20c are aligned with the slots S, whereupon an outward tug is exerted on the blade B, thereby causing the reduced portions of the pin 20 to slip into the smaller opening 24 and past the projections 22 and 23. Since the arc of curvature of the opening 24 is greater than a semi-circle, a positive holding force is exerted on the pivot pin 20 to preclude it moving radially inwardly.

Thus it can be seen that I have provided a simple and inexpensive blade hanger assembly which makes the removal or substitution of blades carried thereby a very simple and inexpensive operation. Furthermore, the blade hanger itself is extremely simple and inexpensive to manufacture. Thus in addition to effecting a substantial saving in labor and material, a great deal of time and effort is saved through the simplification of the attachment and detachment of the blades. This saving is the direct result of the simplicity of construction of my blade hanger assembly.

It should also be noted that the spacer elements 16, 17, 18 and 19 and 25 and 26, in addition to inherently providing the desired spacing of the blades B along the length of the rotary shaft 10, also aid in driving the plates P and R and preclude rocking of the plates about the axis of the shaft 10. It should also be noted that any tendency to wear in the plate P is readily observable when the shaft 10 is not rotated, for it can be readily observed by the operator by pressing inwardly gently on the blade B. If there is any wear in the portions defining the pin-engaging opening 24, it will thus become readily apparent.

From the above it can be readily seen that through the utilization of my rotary blade hangers, I have eliminated one of the most serious disadvantages of rotary blades, for even though a large number of blades may be damaged at one time, new or sharpened blades may be substituted therefor with an absolute minimum of time and effort. At the same time, these blade hangers can be manufactured in large numbers at a very high rate of manufacture and with a minimum of material, and thus the overall cost of my blade hangers is, for practical purposes, negligible.

It will, of course, be understood that various changes may be made in the form, details, arrangement and proportions of the various parts without departing from the scope of my invention.

What is claimed is:

1. A rotary blade hanger comprising a plate member having a perforated portion constructed and arranged to be mounted upon a rotary shaft in pierced relation for rotation therewith and having another portion extending outwardly from said first mentioned portion, said last mentioned portion having an elongated opening extending transversely therethrough, said opening being restricted intermediate its ends and being smaller outwardly of its restriction than it is inwardly of its restriction whereby a rotary-blade-carrying pivot-pin having a reduced portion only slightly larger than the restriction of said opening may be inserted into the larger portion of said opening and its reduced portion thereupon may be pressed outwardly through said restriction and into the smaller portion of said opening to be secured therein, said restricted portion constituting the sole pivot-pin-retainer means of the hanger.

2. A rotary blade hanger comprising a plate member having a portion thereof defining a polygonally shaped aperture therein adapted to engage a rotary shaft for mounting thereon for rotation therewith and having another portion extending radially outwardly from said shaft engaging portion relative to its axis of rotation when so mounted, said last mentioned portion having a pivot-pin receiving opening extending transversely therethrough, said opening being restricted intermediate its ends, a portion of said opening being disposed between said restriction and the shaft-engaging portions of said plate member and being larger in size than the other portion of said opening, said other portion being disposed outwardly of said restriction and being larger than the restricted portion of said opening whereby a rotary-blade-carrying pivot pin having a reduced portion only very slightly larger than the restriction of said opening may be inserted into the larger portion of said opening and its reduced portion may be pressed outwardly through said restriction and into the smaller portion of said opening to be secured therein, said restriction constituting the sole means for retaining such a pivot pin within the smaller portion of said opening.

3. A rotary blade hanger comprising an elongated rigid member having a portion thereof adapted to engage a rotary shaft for rotation therewith while extending radially outwardly therefrom, the portions of said member which extend radially outwardly from the shaft when said member so engages the shaft having a radially arranged elongated transfer slot extending transversely therethrough, said radially outwardly extending portions having fixed pivot-pin-retaining means formed integrally therewith, said retaining means consisting of said slot being restricted intermediate its ends and having its more adjacent portion relative to its shaft engaging portions larger in size than its more remote portion, and a blade-carrying pivot pin having an annular reduced portion only very slightly larger than the restricted portion of said slot rotatably mounted in said remote portion, said restricted portion positively retaining said pivot pin within said remote portion of said opening and constituting the sole means for retaining said pivot pin within said slot.

4. A rotary blade hanger assembly comprising a pair of adjacent rigid elongated plate members each having corresponding portions adapted to be mounted upon a rotary shaft for rotation therewith and each having corresponding portions extending radially outward in side-by-side opposed relationship from the shaft when so mounted thereupon, said outwardly extending portions each having an oppositely disposed elongated slot formed therethrough, each of said slots having oppositely disposed restrictions intermediate their respective ends, the corresponding portions of said slots to one side of their respective restrictions being smaller than the corresponding portions to the other side of their respective restrictions, a pivot pin having a pair of longitudinally spaced reduced portions journaled within the smaller portions of said slots, the reduced portions of said pin being only slightly larger than the restrictions of said slots and the non-reduced portions being greater in size than the smaller portions of said slots and no greater in size than the larger portions of said slots whereby the reduced portions of said pin may be passed into the larger portions of said slots and pressed through their restricted portions into the smaller portions of said slots to be journaled therein, said restrictions positively retaining said pivot pin within said smaller portions against movement longitudinally of said slot and constituting the sole means for retaining said pins within said slots, and a blade mounted on the non-reduced portion of said pin between its reduced portions and extending outwardly therefrom for rotation therewith in radially outwardly extending relation.

5. A rotary blade hanger comprising a pair of opposed rigid plate members each having a portion thereof defining a polygonally shaped aperture therein adapted to engage a rotary shaft for mounting thereon for rotation therewith and having another portion extending radially outwardly from said shaft engaging portion relative to its axis of rotation when so mounted, said last mentioned portion having a pivot-pin receiving slot extending transversely therethrough, said slot being comprised of a pair of intersecting circular openings so that the slot-defining walls consist of a pair of intersecting arcuately shaped portions, one of said intersecting arcuately shaped portions being of a larger radius than the other and being disposed between the other and the shaft-engaging portions of said plate member, the arc of said smaller intersecting arcuately shaped portion being slightly greater than a semi-circle, and a blade-carrying pivot-pin having an annular reduced portion slightly larger in diameter than the distance between the terminal points of the arc of said smaller arcuately shaped portion and intermediate its ends rotatably mounted within the smaller portion of said slot, the portions of said plate member defining said openings at their intersection constituting the sole retainer means for such a pivot pin and positively preventing movement of said pin longitudinally of said slot during rotation of said plate members with such a shaft.

6. A rotary blade hanger comprising a rigid plate member having a central portion adapted to be mounted upon a rotary shaft in pierced relation for rotation therewith and having an end portion extending radially outwardly from said central portion when the latter is so mounted, said central portion having a transverse polygonally shaped shaft-receiving opening formed therethrough adapting the same to engagingly receive such a shaft therethrough, the centrally-disposed opening-defining portions of said plate member being bent laterally from the general plane of said plate member to act as spacer elements between said plate member and adjacent and similar blade hangers which may be mounted on said shaft, said end portion of said plate member having a pivot-pin receiving opening extending transversely therethrough, said opening having a pivot-pin retaining restricted portion intermediate its ends and having a portion thereof disposed between said restriction and said shaft-engaging portions of said plate member and larger in size than the other portion of said opening, said other portion being disposed radially outwardly of said restriction and being larger than at the point of restriction whereby a blade-carrying pivot-pin having a reduced portion intermediate its ends and only slightly larger than the restriction of said opening may be inserted into the larger portion of said opening and its reduced portion may be pressed through said restriction and into the smaller portion of said opening to be secured rotatably therein, said restricted portion constituting the sole means for retaining such a pivot pin within the radially outwardly disposed portion of said opening.

7. A rotary blade hanger comprising a rigid plate member having a central portion and a pair of opposite end portions, said central portion having a polygonally shaped opening formed transversely therethrough adapted to engagingly receive a rotary shaft therein for rotation therewith, the opening-defining portions of said plate member being bent laterally from the general plane of said plate member and constituting spacer elements between said plate member and adjacent and similar blade hangers which may be mounted on said shaft, said end portions extending radially outwardly in opposite directions from said central portion relative to the axis of the opening therein, each of said end portions having an elongated pivot-pin transfer slot extending transversely therethrough and being arranged longitudinally of said plate member, each of said transfer slots being restricted at its medial portion and being divided thereby into an arcuately shaped pivot-pin-receiving portion and a smaller arcuately shaped pivot-pin-engaging portion intersecting said arcuately shaped pivot-pin-receiving portion, said pivot-pin-receiving portion being disposed radially inwardly of said restriction and said pivot-pin-engaging portion being disposed radially outwardly of said restriction, and a blade-carrying pivot-pin having a reduced portion intermediate its medial portion and one end portion thereof, said reduced portion being only slightly larger than the restriction of said slot whereby it may be inserted into said pivot-pin receiving portion and its reduced portion thereafter pressed through the restricted area of said slot into the pivot-pin-engaging portion for journaling therein, said slot restriction constituting the sole means for confining such a pivot pin within said pivot-pin-engaging portion and acting positively to retain such a pivot pin therewithin.

8. A rotary blade hanger assembly comprising a pair of adjacent rigid elongated plate members each having corresponding portions adapted to remain upon the rotary shaft for rotation therewith, and each having corresponding portions extending radially outward in side-by-side opposed relationship from the shaft when so mounted thereupon, said outwardly extending portions each having an oppositely disposed elongated slot formed therethrough, each of said slots having oppositely disposed restrictions intermediate their respective ends, the corresponding portions of said slots to one side of their respective restrictions being smaller than the corresponding portions to the other side of their respective restrictions, a pivot pin having non-reduced end portions and having a pair of longitudinally spaced reduced portions intermediate its end portions, the reduced portions of said pin being only slightly larger than the restrictions of said slots and the non-reduced portions being greater in size than the smaller portions of said slots and no greater in size than the larger portions of said slots whereby the non-reduced end portions of said pivot pin may be passed into the larger portions of said slots until the reduced portions are opposite said restrictions and can be pressed through the restricted portions of said slots into the smaller portions of said slots to be journaled therein, said restrictions positively retaining said pivot pins within said smaller portions of said slots and constituting the sole pivot-pin-retaining means of the assembly and a blade mounted on the non-reduced portions of said pin between its reduced portions and extending outwardly therefrom for rotation therewith in radially outwardly extending relation.

References Cited in the file of this patent

UNITED STATES PATENTS

| | | |
|---|---|---|
| 1,131,002 | Philippi | Mar. 9, 1915 |
| 1,699,151 | Miller et al. | Jan. 15, 1929 |
| 1,751,463 | Backus et al. | Mar. 25, 1930 |
| 2,357,374 | Ariens | Sept. 5, 1944 |
| 2,489,730 | Soenhsen | Nov. 29, 1949 |